United States Patent
Lifson et al.

(10) Patent No.: US 6,892,553 B1
(45) Date of Patent: May 17, 2005

(54) COMBINED EXPANSION DEVICE AND FOUR-WAY REVERSING VALVE IN ECONOMIZED HEAT PUMPS

(75) Inventors: Alexander Lifson, Manlius, NY (US); Thomas J. Dobmeier, Phoenix, NY (US); Michael F. Taras, Fayetteville, NY (US)

(73) Assignee: Carrier Corporation, Syracuse, NY (US)

( * ) Notice: Subject to any disclaimer, the term of this patent is extended or adjusted under 35 U.S.C. 154(b) by 95 days.

(21) Appl. No.: 10/693,593

(22) Filed: Oct. 24, 2003

(51) Int. Cl.[7] .............................................. F25B 13/00
(52) U.S. Cl. ........................ 62/324.1; 62/119; 62/222; 62/513
(58) Field of Search ........................ 62/119, 210, 222, 62/324.1, 502, 513

(56) References Cited

U.S. PATENT DOCUMENTS

| | | | |
|---|---|---|---|
| 4,876,859 A | | 10/1989 | Kitamoto |
| 5,095,712 A | * | 3/1992 | Narreau ........................ 62/113 |
| 5,875,637 A | | 3/1999 | Paetow |
| 6,047,556 A | | 4/2000 | Lifson |
| 6,138,467 A | * | 10/2000 | Lifson et al. .................. 62/217 |
| 6,206,652 B1 | | 3/2001 | Caillat |
| 6,385,981 B1 | * | 5/2002 | Vaisman .................... 62/196.3 |

OTHER PUBLICATIONS

Systems & Advanced Technologies Engineering S.r.I., publication entitled "Compsys—Dynamic Simulation of Gas Compression Plants", dated Jun. 12, 2002.
Copeland Europe publication entitled "Refrigeration Scroll for Parallel Applications" dated Feb. 26, 2002.

* cited by examiner

*Primary Examiner*—Melvin Jones
(74) *Attorney, Agent, or Firm*—Carlson, Gaskey & Olds

(57) ABSTRACT

A refrigerant system is operable in either heating mode or cooling mode. The system is also provided with an economizer cycle that will function in either heating mode or cooling mode. A four-way valve assembly selectively communicates refrigerant from either an indoor heat exchanger or outdoor heat exchanger to an economizer heat exchanger. The valve assembly further includes a restriction for restricting a refrigerant flow downstream of the economizer heat exchanger. The valve assembly provides two distinct restrictions such that a different size restriction is presented to the flow in cooling and heating modes. In this way, a single valve assembly can provide both the required routing for the alternative heating and cooling modes, and at the same time allow for distinct restriction sizes for the two modes without the necessity of separate expansion devices, also improving overall system cost and reliability.

8 Claims, 3 Drawing Sheets

COMBINED EXPANSION DEVICE AND FOUR-WAY REVERSING VALVE IN ECONOMIZED HEAT PUMPS

BACKGROUND OF THE INVENTION

This invention relates to a refrigerant system that may be utilized for operation in both a heating and cooling modes, and wherein an economizer cycle is provided in both modes.

Refrigerant systems provide cooled air in an air conditioning mode and a heated air in a heat pump mode. Essentially, the refrigerant flow through the system is reversed to provide the two distinct modes.

One modem development in refrigerant cycles is the inclusion of an economizer cycle. An economizer cycle taps a portion of a refrigerant flow downstream of the outdoor heat exchanger in the cooling mode or downstream of the indoor heat exchanger in the heating mode. The tapped refrigerant is used to subcool the main refrigerant flow. The tapped refrigerant passes through an economizer expansion device, where its temperature is reduced during the expansion process, and then through an economizer heat exchanger.

The subject of this invention is to combine a four-way reversing valve with a main expansion device in a refrigerant cycle that will preferably have a different size orifice to the refrigerant flow in cooling and heating modes. Having stand alone expansion devices may be undesirably expensive, as well as presents additional reliability concerns.

SUMMARY OF THE INVENTION

In a disclosed embodiment of this invention, a single four-way reversing valve assembly selectively routes a refrigerant serially through an economizer heat exchanger, and then through an expansion device. This valve assembly further preferably includes a plurality of ports, with an internal sliding spool piston. Preferably, the valve consists of four ports. Two of these ports are always in fully open position, and one of the remaining two ports is either fully open or partially closed. The position of the spool piston relative to a partially closed port provides the orifice for a main expansion device. By controlling the relative position of the sliding spool piston in relation to a partially closed port, an orifice size for cooling and heating mode is established. Thus, the partially closed orifice, that is part of the four-way valve port, becomes an expansion device in itself. The size of the orifice is tailored to each of the cooling mode and the heating mode. That is, two separate expansion elements need not be provided for cooling and heating modes.

In a preferred embodiment, a simple control moves the spool piston between heating and cooling positions.

These and other features of the present invention can be best understood from the following specification and drawings, the following of which is a brief description.

DETAILED DESCRIPTION OF THE PREFERRED EMBODIMENT

Figure 1:
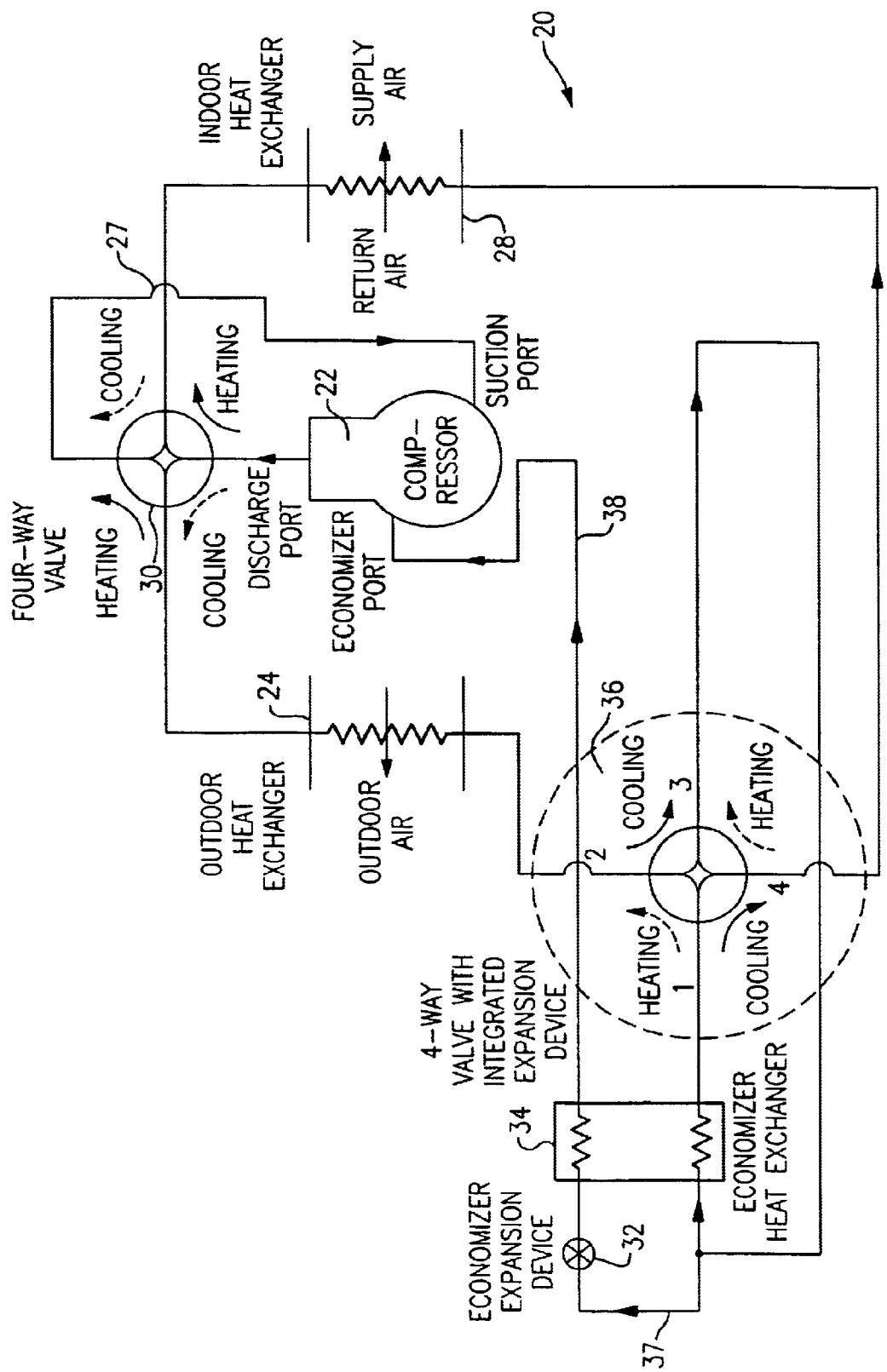
FIG. 1 is a schematic view showing an overall refrigerant cycle.

FIG. 1 shows a refrigerant cycle 20, having a compressor 22. Compressor 22 is preferably a scroll compressor, however, the invention extends to other compressor types.

An outdoor heat exchanger 24 exchanges heat between a refrigerant flow and outdoor air. Indoor heat exchanger 28 exchanges heat with indoor air. A four-way valve 30 controls the flow of refrigerant from the compressor 22 either initially to the outdoor heat exchanger 24 (cooling mode) or to the indoor heat exchanger 28 (heating mode). An economizer expansion device 32 selectively allows the flow of a refrigerant from a tap 37 to economizer heat exchanger 34. While the expansion device can be closed completely and perform the shutoff function as well, distinct components can be used to separate these two duties. A return line 38 returns the tapped flow back to the compressor 22. A line 27 returns the refrigerant from an indoor heat exchanger 28 (cooling mode) or outdoor heat exchanger 24 (heating mode) to the compressor 22, depending upon the position of the four-way valve 30. A valve assembly 36 routes refrigerant to the economizer heat exchanger and compressor suction port as well as provides an expansion function as will be described.

Figure 2:
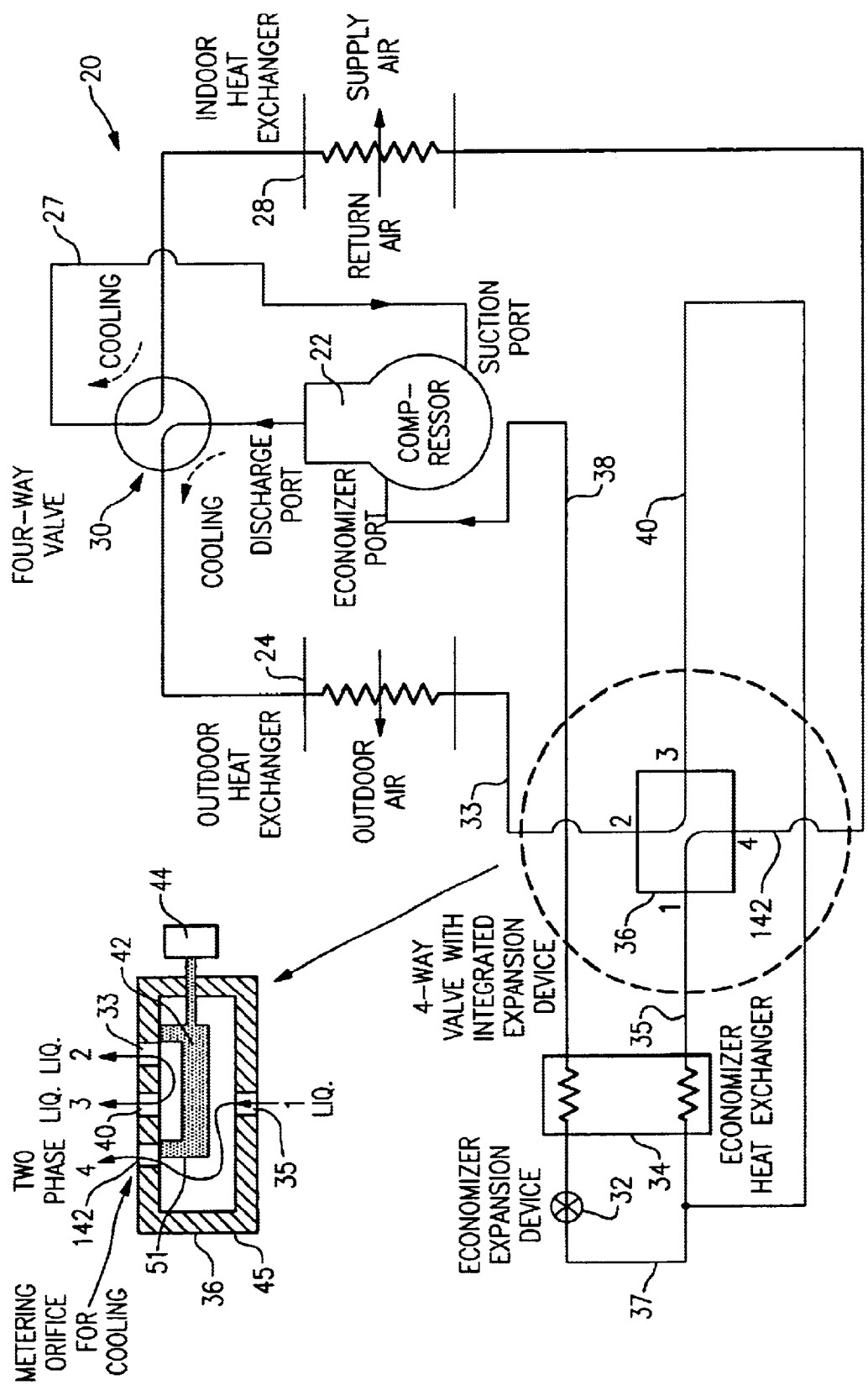
FIG. 2 shows the refrigerant cycle configured for cooling air conditioning mode.

As shown in FIG. 2, the valve 30 is in the air conditioning position. Refrigerant passes serially from the compressor 22 to outdoor heat exchanger 24, eventually to the indoor heat exchanger 28, then returning to the compressor 22 through the line 27. As can be seen in FIG. 2, the valve assembly 36 is in the air conditioning position. In this position, the line 33 downstream of the outdoor heat exchanger 24 communicates the refrigerant to a line 40 that passes to the economizer heat exchanger 34. Further, tap 37 is tapped from this line 40 and passed through the economizer expansion device 32, and through the economizer heat exchanger 34. The line 35 downstream of the main flow of the economizer heat exchanger also passes into the valve assembly 36, and is communicated to the line 142 returning the refrigerant to the indoor heat exchanger 28. As is shown, ports associated with lines 33 and 40 are communicated by the position of a slider spool piston 42. Piston 42 is moved by control 44 within a valve body 45. As is also shown, a port associated with the line 35 communicates refrigerant to a port associated with the line 142. An end face 51 of the spool piston 42 provides a restriction of the flow through the port 142, as shown. As can be appreciated from this figure, the position of the piston 42 can be adjusted to achieve an exact desired size for the orifice or restriction between the end face 51 and the port 142. Now, a designer of the refrigerant cycle 20 can ensure that this restriction is as desired for the cooling mode such as by the relative position of the port 142 and end face 51. The restriction between the end face 51 and the port 142 provides the main expansion device in this manner.

The refrigerant system may also operate in a non-economizer mode. In non-economizer mode, the economizer expansion device 32 is closed. Refrigerant is no longer tapped from the line 37 into the economizer heat exchanger 34. However, when an economizer cycle is desired, valve 32 is opened, and the tapped refrigerant flows from tap 37 through the economizer heat exchanger 34. This tapped refrigerant is cooled after having passed through the economizer expansion device 32. It thus cools the refrigerant flowing in the main flow line through the economizer heat exchanger and the line 35. The details and reasons for providing an economizer cycle are as known, and form no portion of this invention. However, the present invention does provide two functions with a single valve assembly by combining the valve for shifting between heating and cooling modes and routing the refrigerant to the economizer heat exchanger and compressor suction port, and further providing the main expansion valve function. The tapped refrigerant from the line 37, after having passed through the economizer heat exchanger 34 is returned through a line 38 to an intermediate compression point in the compressor 22.

Figure 3:
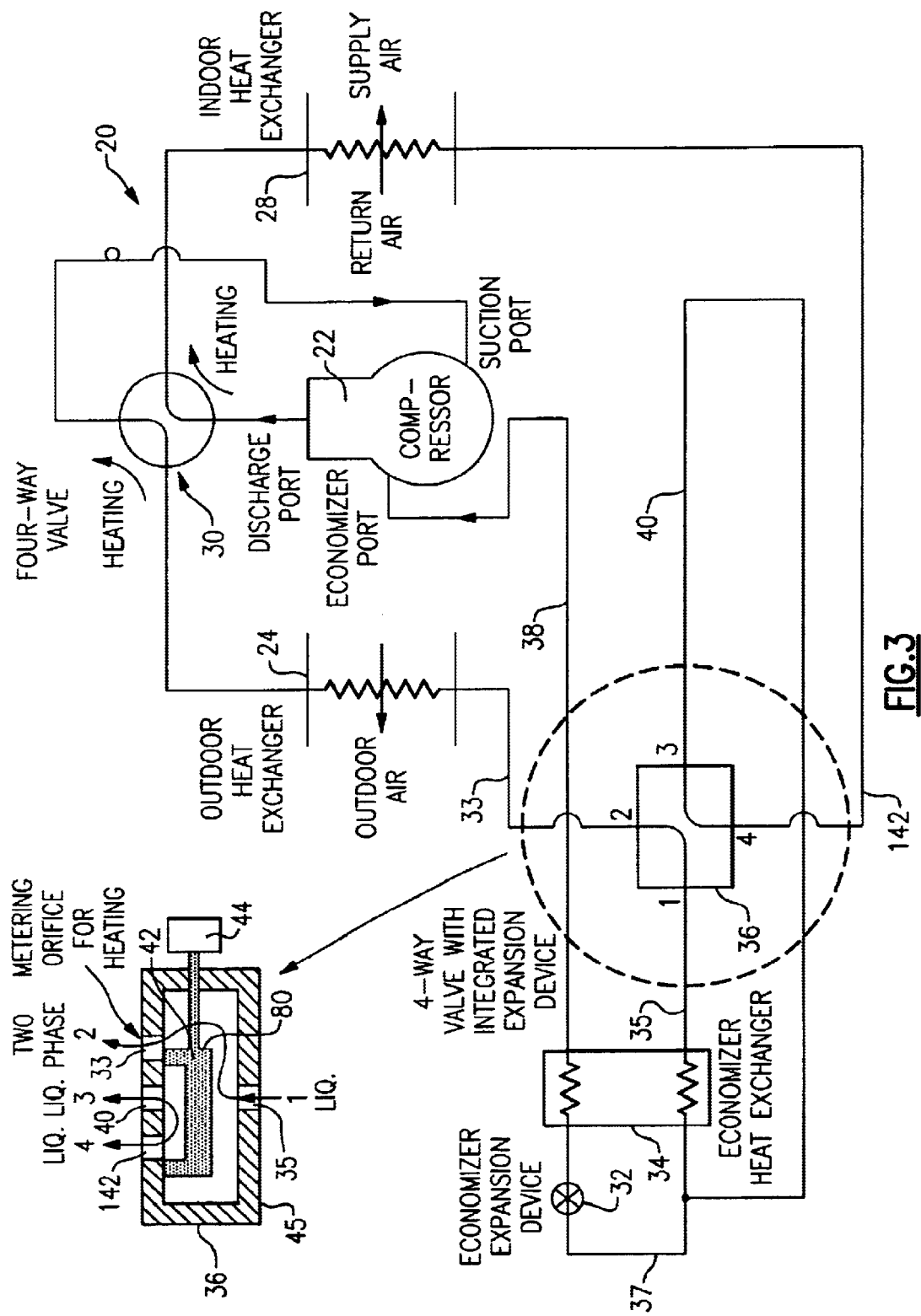
FIG. 3 shows the refrigerant cycle configured for heating mode.

FIG. 3 shows the refrigerant cycle 20, however now in a heating mode. The refrigerant from the compressor 22 passes to the indoor heat exchanger 28, and eventually to the outdoor heat exchanger 24. From the outdoor heat exchanger 24, the refrigerant passes through the valve 30, returning the refrigerant into the line 27, and back to the compressor 22. Again, the system may operate in heating mode without an economizer cycle. Under such conditions, valve 32 is maintained tightly closed. However, should an economizer cycle be desirable, then the valve assembly 36 is opened to provide an expansion function. The valve assembly 36 is in the illustrated position. The refrigerant from the line 37 is now expanded by the valve 32, and subcools the refrigerant in the economizer heat exchanger 34. The refrigerant is again returned through the line 38 back to the compressor 22. As can be appreciated, refrigerant is now routed from the line 42 leading from the indoor heat exchanger to the line 40. The refrigerant now passes the main refrigerant flow from the indoor heat exchanger, through the valve assembly 36, and into the economizer heat exchanger 34. As can also be appreciated, fluid flow from the line 35 is metered by an end 80 of the spool piston 42, and the port associated with the line 33. Again, by careful positioning of the spool piston 42 relative to the port 33, an exact desired metering orifice size can be achieved for the heat pump operation.

Control 44 also operates the valves 30, 32 and 36, dependent on whether the refrigerant system is in the heating or cooling mode, and whether economizer cycle operation is desired. A worker of ordinary skill in the art would recognize how to provide an appropriate control.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A refrigerant cycle comprising:

a compressor;

an outdoor heat exchanger;

an indoor heat exchanger;

a valve assembly for selectively communicating a flow of refrigerant from said outdoor heat exchanger to an economizer heat exchanger in cooling mode, and said valve assembly communicating a flow of refrigerant from said indoor heat exchanger to said economizer heat exchanger in heating mode, said valve assembly presenting a restriction to refrigerant flow downstream of said economizer heat exchanger in both said cooling and heating modes.

2. A refrigerant cycle as set forth in claim 1, wherein said valve assembly includes a sliding spool piston, with end faces of said sliding spool piston providing said restriction to flow with at least one port in a valve body for receiving said spool piston.

3. A refrigerant cycle as set forth in claim 2, wherein two distinct restrictions are formed by said ports and said sliding spool piston in said cooling mode, and said heating mode.

4. A refrigerant cycle as set forth in claim 1, wherein an economizer expansion valve and shut-off valve are placed on a tap line upstream of said economizer heat exchanger.

5. A refrigerant cycle as set forth in claim 1, wherein distinct size restrictions are presented to said refrigerant flow in said cooling mode and said heating mode.

6. A refrigerant cycle as set forth in claim 1, wherein said valve assembly is a four-way valve.

7. A refrigerant cycle comprising:

a compressor;

an outdoor heat exchanger;

an indoor heat exchanger;

a first valve for selectively providing a flow of refrigerant from said compressor to said outdoor heat exchanger in cooling mode, or to said indoor heat exchanger in heating mode; and a second valve assembly for providing an expansion device to a flow of refrigerant from said outdoor heat exchanger in cooling mode, providing an expansion device to said flow of refrigerant, from said indoor heat exchanger in heating mode, said second valve assembly including a sliding spool piston sliding in a valve body, said valve body having at least two ports, and end faces of said sliding spool piston providing a restriction to flow with each of said two ports provide distinct restrictions to flow in said cooling and heating modes.

8. A method of operating a refrigerant cycle comprising the steps of:

(1) providing a first valve for selectively communicating a refrigerant from a compressor to an outdoor heat exchanger, or to an indoor heat exchanger, dependent on whether the refrigerant system is in a cooling or heating mode, providing a tap line for tapping refrigerant to provide an economizer function from either downstream of said outdoor heat exchanger in a cooling mode, or downstream from said indoor heat exchanger in a heating mode, and providing an economizer heat exchanger downstream of said tap line; and (2) moving a second valve to selectively communicate said tap line to a location either downstream of said outdoor heat exchanger or said indoor heat exchanger, in combination with movement of said first valve, and providing a restriction to flow downstream of said economizer heat exchanger for a main refrigerant flow path and in said second valve, said restriction being provided to be of different orifice size when said refrigerant cycle is in a cooling mode or a heating mode.

* * * * *